(12) United States Patent
Kodama et al.

(10) Patent No.: US 10,657,232 B2
(45) Date of Patent: May 19, 2020

(54) INFORMATION PROCESSING APPARATUS AND METHOD OF CONTROLLING INFORMATION PROCESSING APPARATUS

(71) Applicant: FUJITSU LIMITED, Kawasaki-shi, Kanagawa (JP)

(72) Inventors: Hiroyoshi Kodama, Isehara (JP); Shigeto Suzuki, Kawasaki (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 15/966,012

(22) Filed: Apr. 30, 2018

(65) Prior Publication Data
US 2018/0336324 A1    Nov. 22, 2018

(30) Foreign Application Priority Data

May 16, 2017  (JP) ................................. 2017-097463

(51) Int. Cl.
*G06F 21/30*      (2013.01)
*G06F 21/40*      (2013.01)
(Continued)

(52) U.S. Cl.
CPC ............ *G06F 21/305* (2013.01); *G06F 21/40* (2013.01); *G06F 21/44* (2013.01); *G06F 21/629* (2013.01);
(Continued)

(58) Field of Classification Search
CPC ...... G06F 21/305; G06F 21/629; G06F 21/44; G06F 21/40; H04W 12/0806;
(Continued)

(56) References Cited

U.S. PATENT DOCUMENTS

2003/0033466 A1   2/2003  Larson et al.
2006/0039388 A1*  2/2006  Shur ..................... H04L 12/185
                                                              370/401
(Continued)

FOREIGN PATENT DOCUMENTS

JP      2003-132038     5/2003
JP      2016-127521     7/2016

OTHER PUBLICATIONS

"Bulk Server Management using IPMI—Yahoo! Japan Tech Blog", Dec. 4, 2014, Retrieved from the Internet <UEL:https://techblog.yahoo.co.jp/operation/2014-infra-ipmi/>, English Partial Translation (7 pages).

Primary Examiner — Kambiz Zand
Assistant Examiner — Aubrey H Wyszynski
(74) Attorney, Agent, or Firm — Fujitsu Patent Center

(57) ABSTRACT

A communication control device includes an authentication login information storage unit that stores therein authentication login information. When a terminal device connects to a first communication port among a plurality of communication ports, the communication control device compares login information received from the terminal device with the authentication login information, and if they match, the communication control device outputs a command received from the terminal device. A control device includes an authentication unique information storage unit that stores therein authentication unique information. When the communication control device outputs the command received from the terminal device, the control device compares the unique information of the terminal device with the authentication unique information, and if they match, causes a processor to perform only a process of reading control information according to the command received from the terminal device.

10 Claims, 14 Drawing Sheets

(51) Int. Cl.
*H04W 12/06* (2009.01)
*G06F 21/44* (2013.01)
*G06F 21/62* (2013.01)
*H04L 29/06* (2006.01)
*H04W 12/08* (2009.01)

(52) U.S. Cl.
CPC ......... *H04L 63/0876* (2013.01); *H04W 12/06* (2013.01); *H04W 12/0608* (2019.01); *H04W 12/0806* (2019.01)

(58) Field of Classification Search
CPC .............. H04W 12/0608; H04W 12/06; H04L 63/0876; H04L 63/083
USPC ........................................................... 726/2
See application file for complete search history.

(56) References Cited

U.S. PATENT DOCUMENTS

| | | | | |
|---|---|---|---|---|
| 2009/0175165 | A1* | 7/2009 | Leighton | H04L 29/06027 370/221 |
| 2011/0298596 | A1* | 12/2011 | Warrick | H04N 21/2143 340/12.53 |
| 2013/0347028 | A1* | 12/2013 | Warrick | H04L 12/2809 725/30 |
| 2016/0028699 | A1* | 1/2016 | Ambroz | H04L 63/0428 713/168 |
| 2018/0004948 | A1* | 1/2018 | Martin | H04L 63/1425 |

\* cited by examiner

AUTHENTICATION INFORMATION STORAGE UNIT — 141

MANAGEMENT PORT AUTHENTICATION TABLE — 171

| USER ID | PASSWORD | MAC ADDRESS | ACCESS LEVEL |
|---|---|---|---|
| 0001 | Qs23Y5%v | 00:01:03:04:AA:AB | ADMIN |
| 0002 | P+M78Hoo | 00:02:03:07:AA:AC | USER |
| 0003 | 678HgRx$ | 00:05:03:09:AA:AD | OPERATOR |

SERVICE PROVIDING PORT AUTHENTICATION TABLE — 172

| USER ID | PASSWORD | MAC ADDRESS |
|---|---|---|
| 0100 | N&591wUz | 00:04:03:05:AA:AE |

FIG. 8

AUTHENTICATION INFORMATION STORAGE UNIT — 141

ACCESS LEVEL TABLE — 173

| OPERATION TYPE | ADMIN | USER | OPERATOR |
|---|---|---|---|
| GUI LOGIN | 1 | 1 | 1 |
| SSH LOGIN | 1 | 1 | 0 |
| SMASH-CLI LOGIN | 1 | 0 | 0 |
| IDENTIFICATION LAMP ON/OFF | 1 | 1 | 1 |
| SYSTEM COMPONENT MENU DISPLAY | 1 | 1 | 1 |
| SYSTEM COMPONENT MENU SETTING | 1 | 0 | 0 |
| MAINTENANCE DATA DISPLAY | 1 | 1 | 0 |
| MAINTENANCE DATA EDITING | 1 | 0 | 0 |
| NETWORK MENU DISPLAY | 1 | 1 | 0 |
| NETWORK MENU EDITING | 1 | 0 | 0 |
| RAID CONTROLLER MENU DISPLAY | 1 | 1 | 0 |
| RAID CONTROLLER MENU EDITING | 1 | 0 | 0 |

FIG. 9

```
# ipmitool -H 192.xxx.xxx.100 -U 0100 -P ******* sdr | grep "Ambient"
Ambient      | 19 degrees C      | ok ipmitool -H 192.xxx.xxx.100 -U 0100 -P ******* sdr | grep "FAN"
FAN1 SYS     | 5520 RPM          | ok ipmitool raw 0x3 0x1 0x12c
General error: readonly
```

FIG. 14

INFORMATION PROCESSING APPARATUS AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2017-097463, filed on May 16, 2017, the entire contents of which are incorporated herein by reference.

FIELD

The embodiments discussed herein relate to an information processing apparatus and a method of controlling an information processing apparatus.

BACKGROUND

Remote management technology, such as Intelligent Platform Management Interface (IPMI), may be used for remote management of server computers or other information processing apparatuses. In the case of using the IPMI, remote management hardware for receiving commands from a terminal over a network needs to be installed in an information processing apparatus, separately from a processor that executes Operating System (OS) and application software. From a security perspective, a communication port for the management may be provided in the information processing apparatus, separately from a communication port for data communication, so as to separate a management network from a data communication network.

The IPMI enables remotely collecting control information indicating the hardware status of the information processing apparatus and changing the hardware behavior of the information processing apparatus. For example, it is possible to collect sensor information, such as power consumption or temperature, to switch the power between ON and OFF or to set an upper limit for power consumption. Although such remote hardware management is highly convenient, some operational methods is in danger of allowing a malicious third party to illegally manipulate the information processing apparatus, and this is a security risk.

A server system has been proposed which includes a plurality of print circuit assemblies including a host processor card and a server management card for remote management. The server management card collects status information from the plurality of print circuit assemblies and holds the status information. The server management card has a plurality of interfaces for accessing the status information.

In addition, a management system has been proposed which enables a user to use a management communication interface provided in a physical server. This proposed management system includes a Software-Defined Network (SDN) switch connected to the physical server, a cloud control apparatus connected to the SDN switch, and a user apparatus that is able to access the physical server via the SDN switch. The cloud control apparatus updates route control information of the SDN switch such that packets from the user apparatus are transferred to the management communication interface provided in the physical server.

Please see, for example, Japanese Laid-open Patent Publication Nos. 2003-132038 and 2016-127521.

By the way, a user may outsource the operations management of his/her information processing apparatus to a managed service provider. For example, the following situation is considered: a server computer owned by a user company is placed in the facility of a data center provider, and the user company outsources the operations management of the server computer to the data center provider. The information processing apparatus to be managed may be provided with remote management hardware that is conformable to remote management technology, such as IPMI, or with a management communication port. The managed service provider, which takes responsibility of the operations management, is able to efficiently perform the operations management if they are able to access the remote management hardware.

However, existing remote management hardware is able to execute commands to change the behavior of the information processing apparatus. Therefore, the user who owns the information processing apparatus generally would not permit the managed service provider to access the remote management hardware (e.g., to connect to the management communication port), considering a security risk. Due to this outsourcing policy, the operations management of the information processing apparatus performed by the managed service provider may be inefficient.

SUMMARY

According to one aspect, there is provided an information processing apparatus that is accessed from a terminal device via a communication link. The terminal device is assigned unique information. The information processing apparatus includes: a processor that executes a command received from the terminal device; a storage device that stores therein control information to be accessed from the terminal device; a plurality of communication ports including a communication port to which the terminal device is connectable; a first communication control device that includes an authentication login information storage unit that stores therein authentication login information to be used for authenticating access from the terminal device, and that compares, when the terminal device connects to a first communication port among the plurality of communication ports, login information received from the terminal device with the authentication login information, and outputs the command received from the terminal device when the login information matches the authentication login information; and a control device that includes a first authentication unique information storage unit that stores therein first authentication unique information to be used for authenticating connection of the terminal device to the first communication port, and that compares, when the first communication control device outputs the command received from the terminal device, the unique information of the terminal device with the first authentication unique information, and when the unique information matches the first authentication unique information, causes the processor to perform only a process of reading the control information according to the command received from the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of authentication tables;

FIG. 9 illustrates an example of an access level table;

FIG. 14 illustrates an example of a command execution screen.

DESCRIPTION OF EMBODIMENTS

Several embodiments will be described below with reference to the accompanying drawings.

First Embodiment

A first embodiment will now be described.

Figure 1:
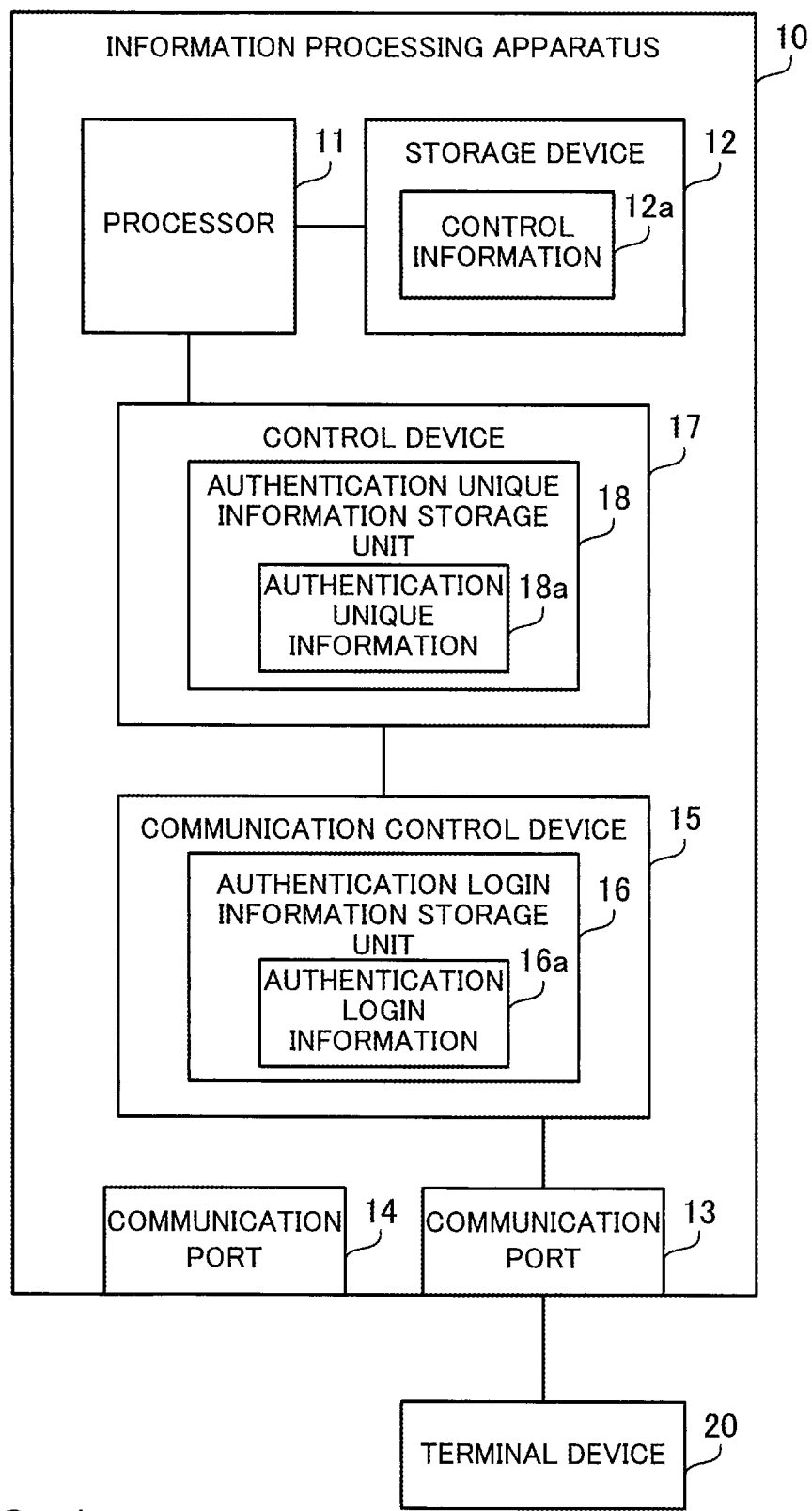
FIG. 1 illustrates an example of an information processing apparatus according to a first embodiment.

FIG. 1 illustrates an example of an information processing apparatus according to the first embodiment.

The information processing apparatus 10 of the first embodiment is a computer that is owned by a user and is operated and managed by a managed service provider. The information processing apparatus 10 may be a server computer that is installed in the facility of the managed service provider. For example, the information processing apparatus 10 owned by a user company is installed in a data center of a data center provider, and the user company outsources the operations management of the information processing apparatus 10 to the data center provider. This contract type may be called "managed housing".

The information processing apparatus 10 is accessible to a terminal device 20 via a communication link. The terminal device 20 is a computer that is used for the operations management of the information processing apparatus 10. For example, the terminal device 20 is a computer that is used by the data center provider that performs the operations management of the information processing apparatus 10. Another apparatus (e.g., a server computer or a communication apparatus) may be interposed between the information processing apparatus 10 and the terminal device 20. The terminal device 20 is assigned unique information. The unique information is identification information that is used for identifying the terminal device 20 when the terminal device 20 accesses the information processing apparatus 10. For example, a communication address, such as a Media Access Control (MAC) address, is used as the unique information.

The information processing apparatus 10 includes a processor 11, a storage device 12, a plurality of communication ports including communication ports 13 and 14, a communication control device 15, and a control device 17. The communication control device 15 includes an authentication login information storage unit 16. The control device 17 includes an authentication unique information storage unit 18. Referring to FIG. 1, the processor 11 and the storage device 12 are provided outside the control device 17, but at least one of the processor 11 and the storage device 12 may be provided inside the control device 17. In addition, the storage device 12 and the authentication unique information storage unit 18 may be integrated as a single storage device.

The processor 11 executes commands received from the terminal device 20. The processor 11 may be called a processor. The processor 11 may execute commands according to a program. The storage device 12 stores therein control information 12a that is accessible to the terminal device 20. The storage device 12 is a volatile semiconductor memory (e.g., Random Access Memory (RAM)) or a non-volatile semiconductor memory (e.g., flash memory).

Some of the commands received may be commands to read the control information 12a from the storage device 12. Some of the commands received may be commands to rewrite the control information 12a or other information or commands to change the hardware behavior. For example, such commands include a command to switch the power of the information processing apparatus 10 between ON and OFF and a command to set an upper limit for power consumption.

For example, the control information 12a indicates the hardware status of the information processing apparatus 10. The control information 12a may be collected or generated by the processor 11. The control information 12a may include sensor information, such as power consumption, temperature, or fan rotation speed, with respect to hardware components provided in the information processing apparatus 10. In addition, the control information 12a may include log information indicating the usage of computing resources, such as a Central Processing Unit (CPU), a RAM, a Hard Disk Drive (HDD), and a network interface.

The communication port 13 and the communication port 14 may be connected to different networks. The communication port 13 is accessible to the terminal device 20. The communication port 13 receives a command, the unique information of the terminal device 20, and login information from the terminal device 20. The unique information and login information may be appended to the command. The login information is account information assigned to a user using the terminal device 20 and includes a user ID and a password, for example.

The communication control device 15 controls communications via the communication port 13. The authentication login information storage unit 16 stores therein authentication login information 16a. The authentication login information storage unit 16 is a volatile semiconductor memory (e.g., RAM) or a non-volatile semiconductor memory (e.g., flash memory), for example. The authentication login information 16a is used for authenticating access from the terminal device 20. For example, the authentication login information 16a is login information, such as a user ID and password assigned to an authorized user, and is registered in the authentication login information storage unit 16 in advance. The authentication login information 16a may be registered via the communication port 14.

When the terminal device 20 connects to the communication port 13, the communication control device 15 compares login information received from the terminal device 20 with the authentication login information 16a stored in the authentication login information storage unit 16 to determine whether they match. For example, the communication control device 15 determines whether the received login information and the authentication login information 16a match in terms of user ID and password. If a match is found between the received login information and the authentication login information 16a, the communication control device 15 outputs a command received from the terminal device 20.

The control device 17 controls execution of commands. The authentication unique information storage unit 18 stores therein authentication unique information 18a. For example, the authentication unique information storage unit 18 is a volatile semiconductor memory (e.g., RAM) or a non-volatile semiconductor memory (e.g., flash memory). The authentication unique information 18a is used for authenticating connection of the terminal device 20 to the communication port 13. The authentication unique information 18a is a communication address, such as a MAC address, which is assigned to an authorized terminal device, for example, and is registered in the authentication unique information storage unit 18 in advance. The authentication unique information 18a may be registered via the communication port 14, as with the authentication login information 16a.

When the communication control device 15 outputs a command received from the terminal device 20, the control device 17 compares the unique information of the terminal device 20 with the authentication unique information 18a stored in the authentication unique information storage unit 18 to determine whether they match. For example, the control device 17 determines whether the MAC address of the terminal device 20 connecting to the communication port 13 matches the previously registered MAC address. If a match is found between the unique information of the terminal device 20 and the authentication unique information 18a, the control device 17 causes the processor 11 to perform a process according to the command received from the terminal device 20.

In this connection, with respect to the command to be executed after the above authentication procedure, the control device 17 permits only a process of reading the control information 12a but rejects processes other than the read process, which include a process of writing information and a process of changing hardware behavior. The control information 12a read by the processor 11 is transmitted to the terminal device 20 via the control device 17, the communication control device 15, and the communication port 13, for example. In this connection, in the case where the processor 11 is provided inside the control device 17, the processor 11 may be used to perform the authentication in the control device 17.

With the information processing apparatus 10 of the first embodiment, in the case where the login information received from the terminal device 20 matches the authentication login information 16a, a command output from the terminal device 20 and received at the communication port 13 passes through the communication control device 15. Then, in the case where the unique information of the terminal device 20 matches the authentication unique information 18a, a process according to the command output from the terminal device 20 is performed by the processor 11. At this time, the process to be performed by the processor 11 is limited to a process of reading the control information 12a.

Compared with the case of accessing the control device 17 via the communication port 14, the above approach makes it possible to enhance security of access to the control device 17 via the communication port 13, and thus to provide the communication port 13 as a highly safety communication port. Even in the case where the user who owns the information processing apparatus 10 permits the managed service provider to connect to the communication port 13, this connection has a low security risk. As a result, it is possible to perform the operations management using the control information 12a held in the information processing apparatus 10 and therefore to perform the operations management of the information processing apparatus 10 efficiently. For example, compared with the case of using only external sensor information like ambient temperature, which is obtained from outside the information processing apparatus 10, the use of internal sensor information, which is obtained from inside the information processing apparatus 10, enables detailed operations management.

Second Embodiment

A second embodiment will now be described.

Figure 2:
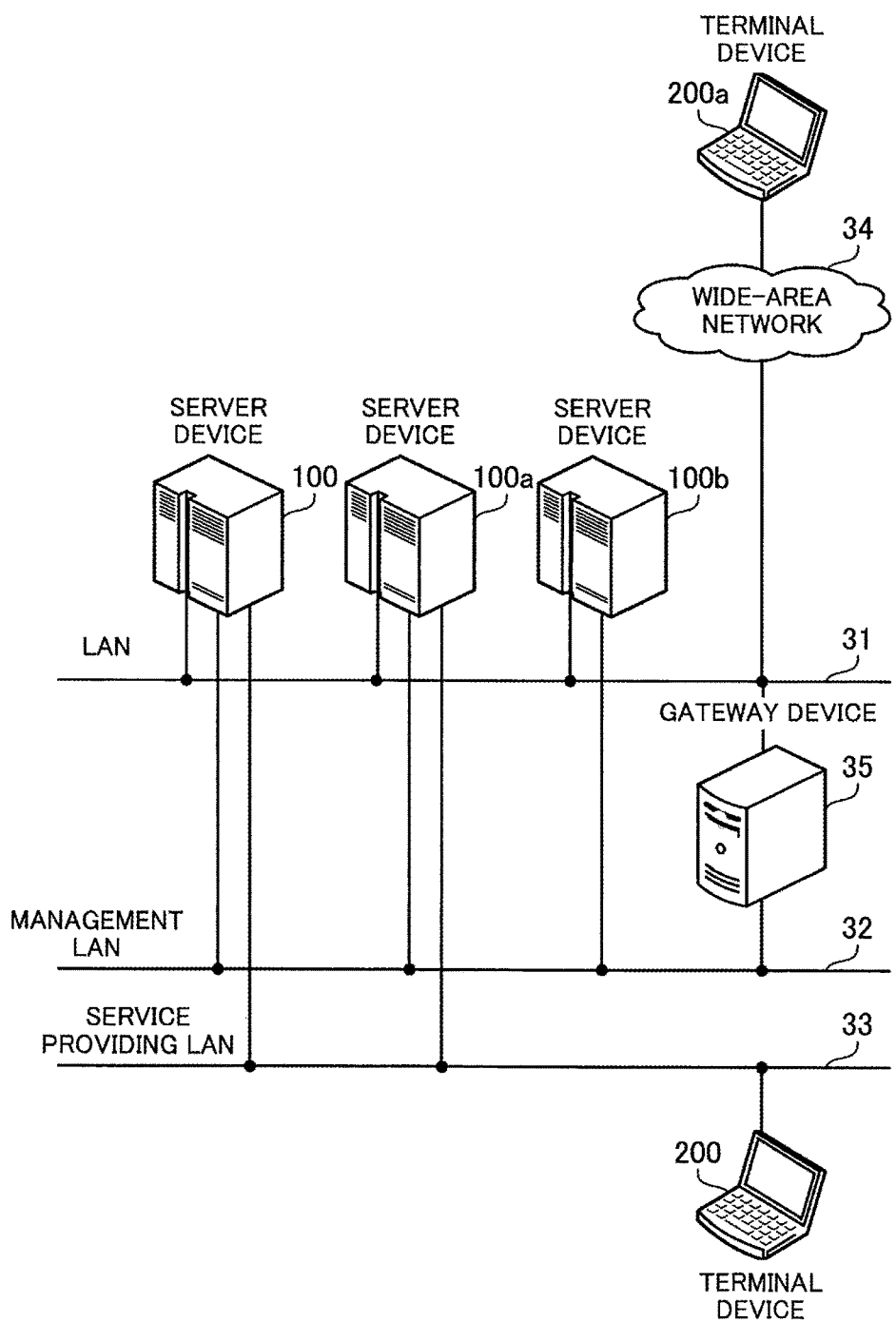
FIG. 2 illustrates an example of an information processing system according to a second embodiment.

FIG. 2 illustrates an example of an information processing system according to the second embodiment.

The information processing system of the second embodiment operates and manages server devices placed in a data center. Considerable usage types of the data center are standard housing (type A), hosting (type B), and managed housing (type C).

The standard housing is a usage type in which a server device owned by a user company is placed in a data center and the user company operates and manages the server device. In this standard housing, the data center provider is not given an authority to access the server device, and performs limited management using only external information such as room temperature, which is obtained from outside the server device. The hosting is a usage type in which the data center provider rents computing resources of their owned server device to the user company. The computing resources may be rented on a physical machine basis (i.e., physical license) or on a virtual machine basis (i.e., virtual license). In this hosting, not the user company but the data center provider operates and manages the server device.

The managed housing is a usage type in which a server device owned by the user company is placed in the data center and the user company outsources the operations management of the server device to the data center provider. In this managed housing, the data center provider is given an authority to access the server device where needed for the operations management. However, with regard to an IPMI communication port, there is a security risk. That is, the sever device might be hijacked by maliciously using the IPMI communication port. Therefore, the data center provider receives an explicit permission to connect to the IPMI communication port, from the user company. The second embodiment uses the managed housing as a usage type of the data center. In the second embodiment, it is assumed that, in the case where a "service providing port" (to be described later) is provided in the server device, the data center provider is permitted to connect to the service providing port.

The information processing system of the second embodiment includes a Local Area Network (LAN) 31, a management LAN 32, a service providing LAN 33, a wide-area network 34, a gateway device 35, server devices 100, 100a, and 100b, and terminal devices 200 and 200a. The server device 100 corresponds to the information processing apparatus 10 of the first embodiment. The terminal device 200 corresponds to the terminal device 20 of the first embodiment.

The LAN 31, management LAN 32, service providing LAN 33, gateway device 35, server devices 100, 100a, and 100b, and terminal device 200 are placed in a data center. The terminal device 200a is placed in a user company. The server devices 100, 100a, and 100b are connected to the LAN 31 and management LAN 32. Further, the server devices 100 and 100a are connected to the service providing LAN 33. The terminal device 200 is connected to the service providing LAN 33. The gateway device 35 is connected to the LAN 31 and management LAN 32. The terminal device 200a is connected to the wide-area network 34. The LAN 31 is accessible from the wide-area network 34.

The LAN 31 is a local network to be used for data communication within the data center. The server devices 100, 100a, and 100b are accessible from the wide-area network 34 via the LAN 31. In addition, the server devices 100, 100a, and 100b are able to communicate with each other over the LAN 31. For example, a virtual machine is migrated from one to another of the server devices 100, 100a, and 100b over the LAN 31. In this connection, a plurality of LANs may be configured in the data center for external communication via the wide-area network 34, for access to a storage device, for migration of a virtual machine, and for other different purposes. In this case, communication ports that corresponds one-to-one to the LANs may be provided in each of the server devices 100, 100a, and 100b.

The management LAN 32 is a local network for use in remote management of the server devices 100, 100a, and 100b using the IPMI. The management LAN 32 is accessible via the gateway device 35. From a security perspective, the LAN 31 for data packets and the management LAN 32 for IPMI commands are provided separately. The server devices 100, 100a, and 100b are each connected to the management LAN 32 via a management communication port (management port) different from a communication port to be used for connection to the LAN 31.

The service providing LAN 33 is a local network to be used for collecting information that is useful for the data center provider to perform the operations management of the server devices 100 and 100a. The service providing LAN 33 may be configured such as not to be accessible from the wide-area network 34. The service providing LAN 33 carries IPMI commands from the terminal device 200 to the server devices 100 and 100a. The server devices 100 and 100a are each connected to the service providing LAN 33 via a communication port (service providing port), which is different from the communication port used for connection to the LAN 31 and the management port used for connection to the management LAN 32.

The wide-area network 34 is a wide-area data communication network, such as the Internet. The gateway device 35 is a relay device for relaying access from the wide-area network 34 to the management LAN 32. The gateway device 35 may be a server computer. The gateway device 35 enhances the security of the management LAN 32 by allowing accesses to pass only when the accesses are authenticated using authentication information, such as a user ID and a password, among accesses from the wide-area network 34. When the authentication has succeeded, the gateway device 35 transfers IPMI commands from the wide-area network 34 to the management LAN 32, and transfers results of executing the IPMI commands to the wide-area network 34.

The server devices 100, 100a, and 100b are server computers that are owned by user companies and are placed in the data center. The server devices 100, 100a, and 100b each include a management port having an IPMI function, in addition to a communication port for data communication.

The management port receives IPMI commands from the wide-area network 34 via the gateway device 35 and management LAN 32. This enables the user companies to remotely manage the server devices 100, 100a, and 100b. Further, the server devices 100 and 100a are each provided with a service providing port having a more limited IPMI function than the management port. The service providing port receives IPMI commands from the service providing LAN 33. This enables the data center provider to efficiently monitor the operating statues of the server devices 100 and 100a. In this connection, the server device 100b does not have such a service providing port.

The terminal device 200 is a client computer that is used by a staff member of the data center provider. The terminal device 200 transmits an IPMI read command to the server devices 100 and 100a via the service providing LAN 33, and receives internal information of the server devices 100 and 100a as a response to the IPMI command. Using the received information, the staff member of the data center provider is able to provide various services, such as analysis of the operating statuses of the server devices 100 and 100a and control of room temperature at the data center. In this connection, the server computers may be configured to transmit such IPMI commands.

The terminal device 200a is a client computer that is used by a staff member of the user company. The terminal device 200a transmits an IPMI command to a server device 100, 100a, 100b via the wide-area network 34, the gateway device 35, and the management LAN 32. The terminal device 200a is able to transmit an IPMI read command and to receive internal information as a response to the IPMI command, as with the terminal device 200. In addition, the terminal device 200a is able to transmit an IPMI write command and an IMPI command for behavioral change, in order to change the hardware behavior of the server device 100, 100a, 100b.

IPMI commands will now be described. The IPMI commands are used for remote management that is performed by management hardware, which is different from computing resources for executing OS and application software. The management hardware may be called Baseboard Management Controller (BMC). Some IPMI commands are for behavioral change, e.g., for switching the power between ON and OFF and for setting an upper limit for power consumption. In addition, some IPMI commands are for monitoring, e.g., for collecting sensor information, such as power consumption, component temperature, and fan rotation speed.

For example, an IPMI command is input in a form of "ipmitool-H[IP address]-U[user ID]-P[password][command]." The Internet Protocol (IP) address here is an address assigned to a destination server device. The user ID and password here are previously assigned to a user who enters the IPMI command.

Examples of the above command include the following: (i) "mc info" for confirming the version of firmware; (ii) "mc reset" for resetting BMC; (iii) "fru print" for confirming field-replaceable units; (iv) "sdr" for displaying sensor information; (v) "power [off soft, on, reset, cycle]" for controlling power supply; (vi) "chassis bootdev cdrom" for changing a boot device; (vii) "sel [info, list, clear]" for manipulating log data; (viii) "user [list, set password]" for performing user settings; (ix) "lan [print, set opaddr]" for setting a BMC communication port; (x) "bmc reset cold" for restarting BMC; and (xi) "shell" for starting shell.

In addition, an IPMI command may be input in a form of "ipmitool raw [. . . ]". For example, "ipmitool raw 0x3 0x1

0x12c" is an IPMI command for setting an upper limit for power consumption of a server device to 300 W. Here, "0x3" is a command for limiting the power consumption, "0x1" is for validating the limit for the power consumption, and "0x12c" indicates that the upper limit for the power consumption is 300 W.

The following describes the hardware of the server devices 100 and 100b and the terminal device 200. The server device 100a is implemented with the same hardware configuration as the server device 100. The terminal device 200a is implemented with the same hardware configuration as the terminal device 200.

Figure 3:
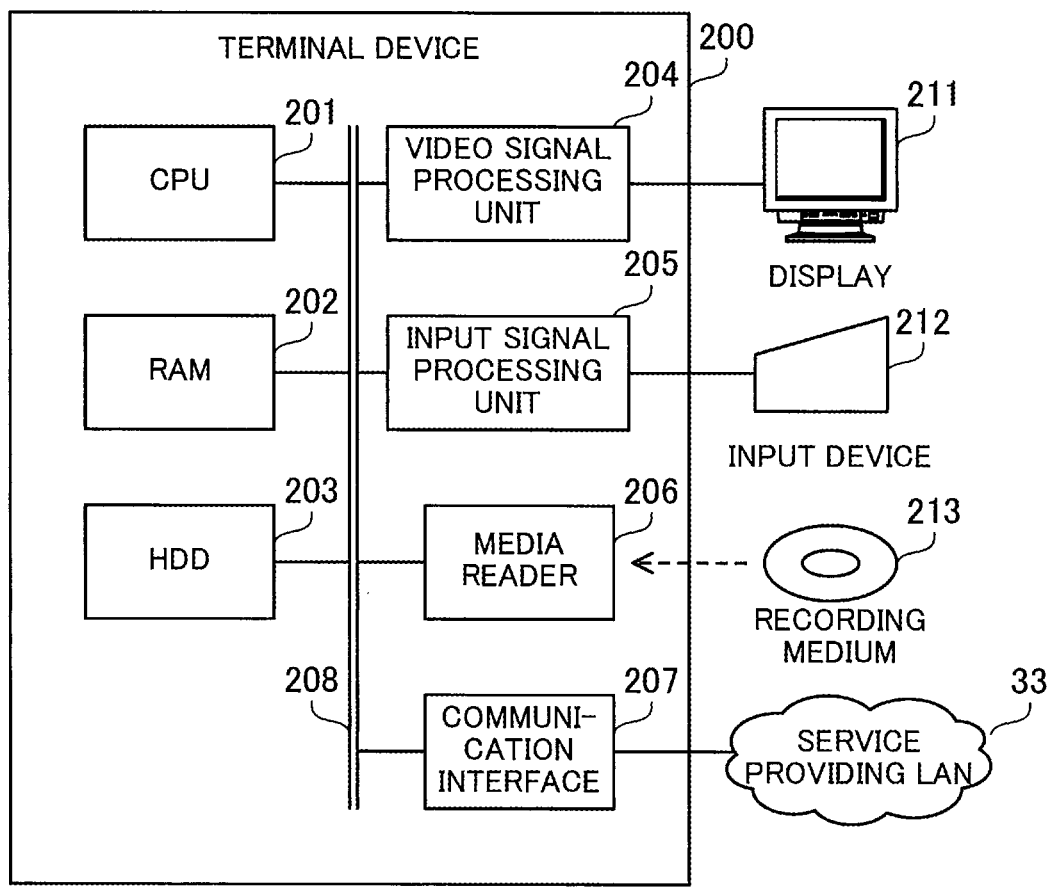
FIG. 3 is a block diagram illustrating an example of hardware configuration of a terminal device.

FIG. 3 is a block diagram illustrating an example of hardware configuration of a terminal device.

The terminal device 200 includes a CPU 201, a RAM 202, an HDD 203, a video signal processing unit 204, an input signal processing unit 205, a media reader 206, and a communication interface 207, all of which are connected to a bus 208.

The CPU 201 is a processor that has a computational circuit to execute program instructions. The CPU 201 loads at least part of a program and data from the HDD 203 to the RAM 202 and executes the program. The CPU 201 may include a plurality of processor cores, and the terminal device 200 may include a plurality of processors. These processors or processor cores may execute the program in parallel. Such a set of processors may be referred to as a "multiprocessor" or simply a "processor."

The RAM 202 is a volatile semiconductor memory that temporarily stores programs to be executed by the CPU 201 and various data to be used by the CPU 201 in computation. A memory device of different type from RAM or a plurality of memory devices may be used.

The HDD 203 is a non-volatile storage device to store software programs, such as OS, middleware, and application software, and data. The terminal device 200 may include other kinds of storage devices, such as flash memories and Solid State Drives (SSD), or a plurality of non-volatile storage devices.

The video signal processing unit 204 outputs images on a display 211 connected to the terminal device 200 in accordance with instructions from the CPU 201. The display 211 may be, for example, a Cathode Ray Tube (CRT) display, Liquid Crystal Display (LCD), plasma display, Organic Electro-Luminescence (OEL) display, or another display device.

The input signal processing unit 205 receives input signals from an input device 212 connected to the terminal device 200 and gives them to the CPU 201. Examples of the input device 212 include pointing devices (e.g., mouse, touchscreen, touchpad, and trackball), keyboards, remote controllers, button switches, and others. Plural types of input devices may be connected to the terminal device 200.

The media reader 206 is a device for reading programs and data stored in a recording medium 213. The recording medium 213 may be, for example, a magnetic disk, an optical disc, a magneto-optical disk (MO), and a semiconductor memory device. Magnetic disks include Flexible Disks (FD) and HDDs. Optical discs include Compact Discs (CD) and Digital Versatile Discs (DVD).

The media reader 206 reads programs and data out of the recording medium 213 and copies them in another recording medium (e.g., RAM 202 or HDD 203). The read programs may be executed by, for example, the CPU 201. The recording medium 213 may be a portable recoding medium and may be used for the purpose of distribution of programs and data. The recording medium 213 and HDD 203 may be referred to as computer-readable recording media.

The communication interface 207 is connected to the service providing LAN 33 for communication with the server devices 100 and 100a over the service providing LAN 33.

Figure 4:
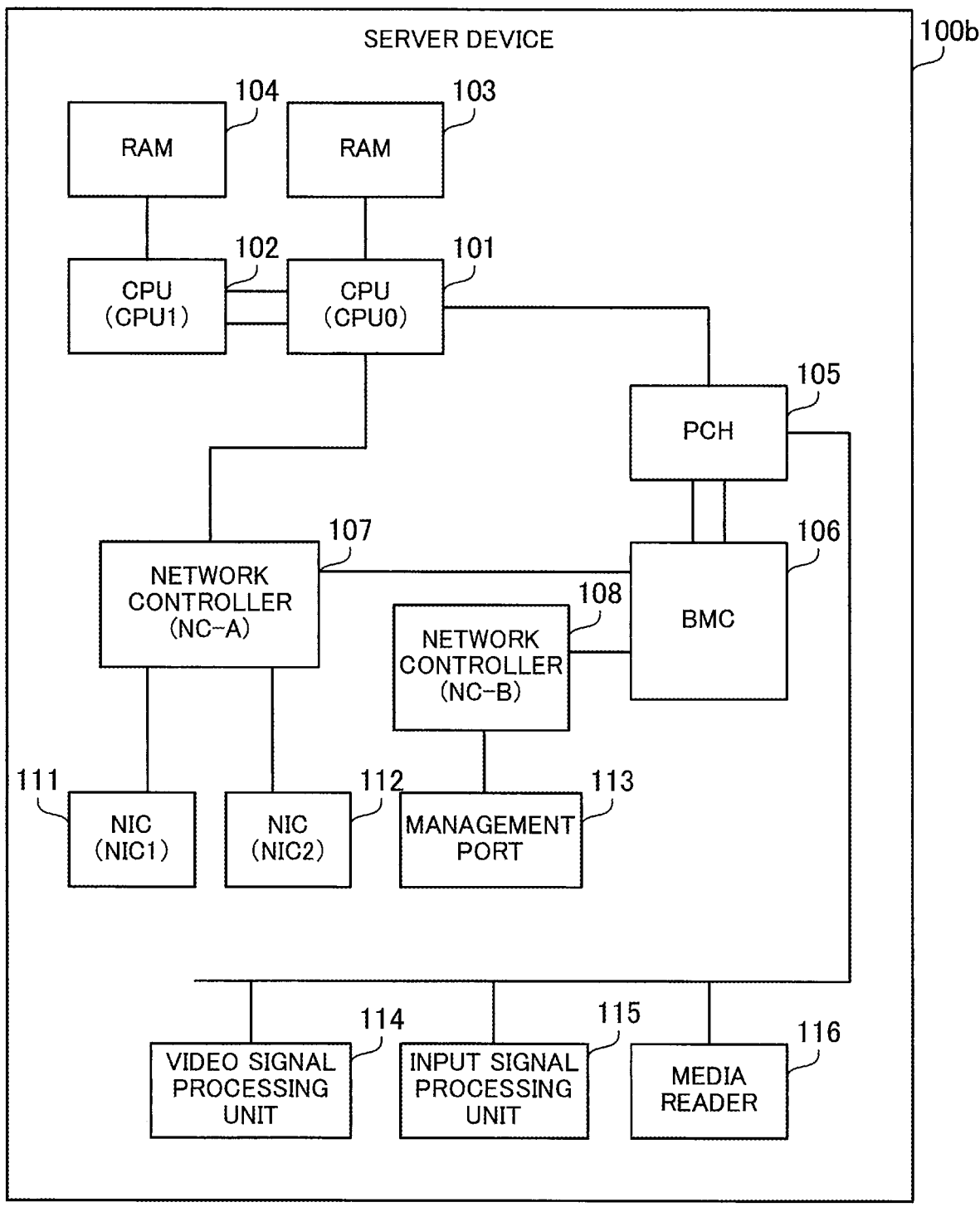
FIG. 4 is a block diagram illustrating a first example of hardware configuration of a server device.

FIG. 4 is a block diagram illustrating a first example of hardware configuration of a server device.

The server device 100b includes CPUs 101 and 102, RAMS 103 and 104, Platform Controller Hub (PCH) 105, a BMC 106, network controllers 107 and 108, Network Interface Cards (NIC) 111 and 112, a management port 113, a video signal processing unit 114, an input signal processing unit 115, and a media reader 116.

The CPU 101 (CPU0) is a main CPU, whereas the CPU 102 (CPU1) is a sub-CPU. Each of the CPUs 101 and 102 has Peripheral Component Interconnect express (PCIe) and Double Data Rate 4 (DDR4) as interfaces. The PCIe is a bus interface that enables communication between a processor and peripheral devices. The DDR4 is an interface that enables the processor to access a memory. The RAM 103 is connected to the CPU 101, and the RAM 104 is connected to the CPU 102. The CPUs 101 and 102 are connected by Quick Path Interconnect (QPI). The QPI is an interface that enables direct interconnection between a plurality of processors.

The PCH 105 is a bus management chip. The PCH 105 includes Serial Advanced Technology Attachment (SATA), Universal Serial Bus Driver (USBD), Serial Peripheral Interface (SPI), Low Pin Count (LPC), and PCIe as interfaces. The SATA is an interface that enables a connection with a recording drive. The USBD and SPI are serial bus interfaces that enable connections with peripheral devices. The LPC is a bus interface that enables a connection with a low-bandwidth device. The CPU 101 and PCH 105 are connected by Direct Media Interface (DMI).

The BMC 106 is a management hardware component that executes IPMI commands. The BMC 106 collects various information from the hardware components of the server device 100b and holds the information. The BMC 106 is able to execute IPMI commands, not via the CPU 101 or 102 or PCH 105. That is, the BMC 106 is able to execute the IPMI commands while the CPUs 101 and 102 are inactive. For example, when the BMC 106 receives an IPMI command for power-on while the CPUs 101 and 102 are inactive, the BMC 106 activates the CPUs 101 and 102. The BMC 106 provides information held by the BMC 106 in response to an IPMI read command.

The BMC 106 is connected to the PCH 105 and network controllers 107 and 108. The BMC 106 and PCH 105 are connected by Keyboard Controller Style (KCS). The KCS is an interface that enables communication with the BMC 106. The BMC 106 and network controller 107 are connected by Network Controller Sideband Interface (NCSI) (NCSI-A). The BMC 106 and network controller 108 are connected by NCSI (NCSI-B).

The BMC 106 receives an IPMI command from one of the network controllers 107 and 108. In the case illustrated in FIG. 2, a "dedicated type" that provides a LAN for IPMI commands separately from a LAN for data packets is employed. However, a "shared type" that provides a common LAN may be employed. In the "dedicated type", IPMI commands are input from the network controller 108 to the BMC 106. In the "shared type", IPMI commands are input from the network controller 107 to the BMC 106. Which to employ, the "dedicated type" or the "shared type", is set in the BMC 106 in advance.

The network controller 107 (NC-A) performs protocol processing to control packet communication. The network controller 107 is connected to the CPU 101, BMC 106, and NICs 111 and 112. When a packet including data, other than IPMI commands, arrives at the NIC 111 or 112, the network controller 107 outputs the received data to the CPU 101. When a packet including an IPMI command arrives at the NIC 111 or 112, the network controller 107 outputs the received IPMI command to the BMC 106.

The network controller 108 (NC-B) performs protocol processing in order to control packet communication. The network controller 108 is connected to the BMC 106 and management port 113. When a packet including an IPMI command arrives at the management port 113, the network controller 108 outputs the IPMI command to the BMC 106.

The NIC 111 (NIC1) is a communication interface including a communication port that is connected to the LAN 31. The NIC 112 (NIC2) is a communication interface including a communication port that is connected to the LAN 31 or another LAN. The management port 113 is a communication port that is connected to the management LAN 32. Each of the NICs 111 and 112 and management port 113 is connected to a communication device, such as a switch or a router, with a cable.

The video signal processing unit 114 corresponds to the above-described video signal processing unit 204. A display may be connected to the video signal processing unit 114. The input signal processing unit 115 corresponds to the above-described input signal processing unit 205. An input device may be connected to the input signal processing unit 115. The media reader 116 corresponds to the above-described media reader 206. A recording medium 213 or another recording medium may be inserted in the media reader 116. The video signal processing unit 114, input signal processing unit 115, and media reader 116 are connected to the PCH 105.

The server device 100b is able to receive IPMI commands including commands for behavioral change via the management port 113 and network controller 108 and cause the BMC 106 to execute the IPMI commands. To reduce a security risk, the user company probably does not permit the data center provider to connect to the management port 113. In addition, the server device 100b does not have a communication port for IPMI, other than the management port 113. Therefore, the terminal device 200 is not able to access information held in the BMC 106 or to use this information in the operations management of the server device 100b.

Figure 5:
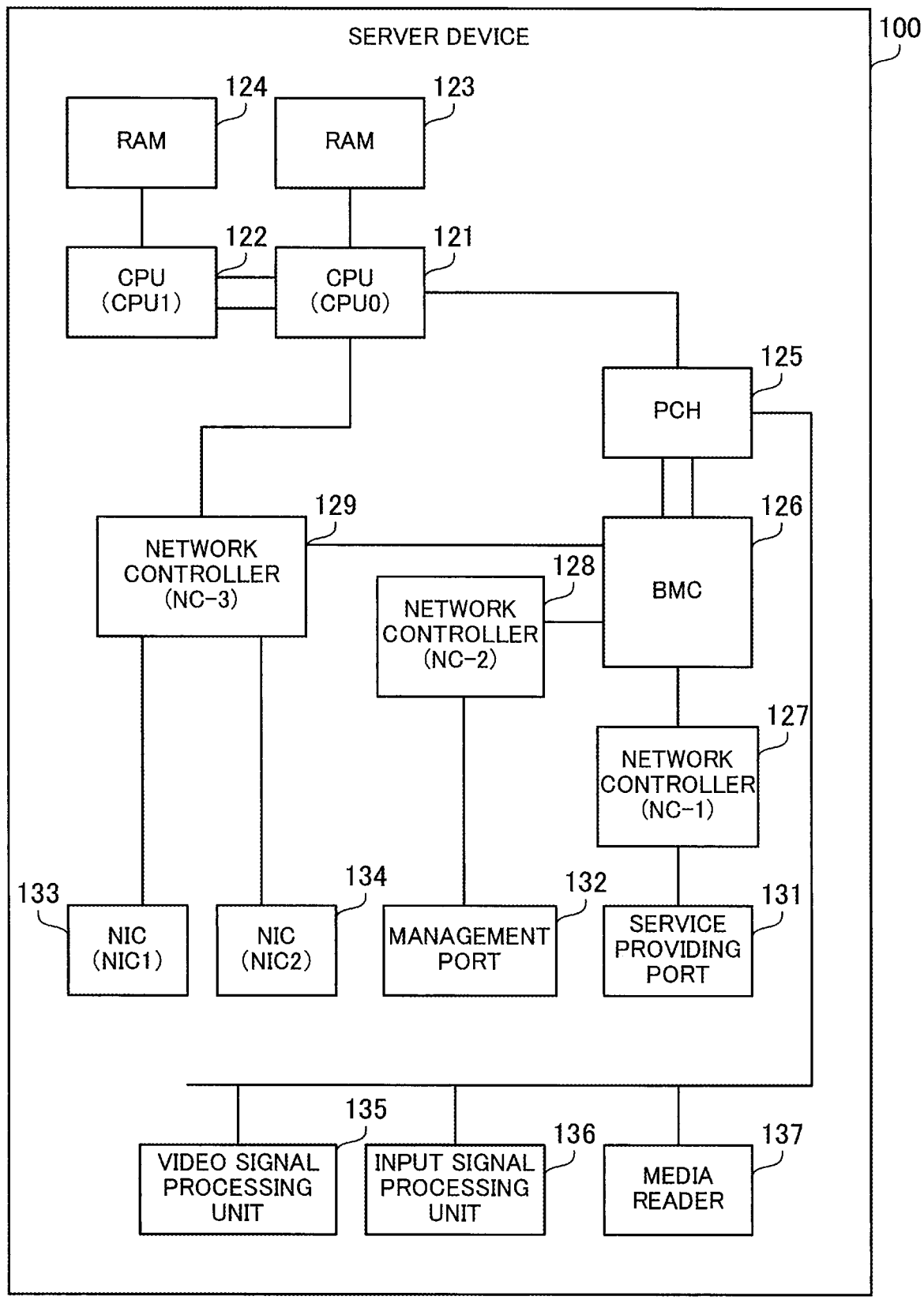
FIG. 5 is a block diagram illustrating a second example of hardware configuration of the server device.

FIG. 5 is a block diagram illustrating a second example of hardware configuration of the server device.

The server device 100 includes CPUs 121 and 122, RAMS 123 and 124, a PCH 125, a BMC 126, network controllers 127, 128, and 129, a service providing port 131, a management port 132, NICs 133 and 134, a video signal processing unit 135, an input signal processing unit 136, and a media reader 137.

The CPU 121 (CPU0) corresponds to the CPU 101 of the server device 100b. The CPU 122 (CPU1) corresponds to the CPU 102 of the server device 100b. The RAMS 123 and 124 correspond to the RAMS 103 and 104 of the server device 100b. The PCH 125 corresponds to the PCH 105 of the server device 100b. The network controller 128 (NC-2) corresponds to the network controller 108 of the server device 100b. The network controller 129 (NC-3) corresponds to the network controller 107 of the server device 100b. The management port 132 corresponds to the management port 113 of the server device 100b. The NIC 133 (NIC1) corresponds to the NIC 111 of the server device 100b. The NIC 134 (NIC2) corresponds to the NIC 112 of the server device 100b. The video signal processing unit 135, input signal processing unit 136, and media reader 137 correspond to the video signal processing unit 114, input signal processing unit 115, and media reader 116 of the server device 100b, respectively.

In this connection, the BMC 126 corresponds to the control device 17 of the first embodiment. The network controller 127 corresponds to the communication control device 15 of the first embodiment. The service providing port 131 corresponds to the communication port 13 of the first embodiment. The management port 132 corresponds to the communication port 14 of the first embodiment.

The BMC 126 is a management hardware component that executes IPMI commands. The BMC 126 performs various processes, such as a process of reading stored information and a process for behavioral change, according to received IPMI commands, not via the CPU 121, 122 or PCH 125. The BMC 126 is connected to the PCH 125 and network controllers 127, 128, and 129. The BMC 126 is connected to the PCH 125 by KCS. In addition, the BMC 126 is connected to the network controller 127 by NCSI (NCSI-1), is connected to the network controller 128 by NCSI (NCSI-2), and is connected to the network controller 129 by NCSI (NCSI-3).

The BMC 126 receives IPMI commands from one of the network controller 128 and network controller 129. In the case of the "dedicated type", the IPMI commands are input from the network controller 128 to the BMC 126. In the case of the "shared type", the IPMI commands are input from the network controller 129 to the BMC 126. These IPMI commands may be transmitted from the terminal device 200a. In addition, the BMC 126 receives IPMI commands from the network controller 127. These IPMI commands may be transmitted from the terminal device 200.

When receiving an IPMI command, the BMC 126 performs an authentication process. The authentication process includes MAC authentication using a transmission-source MAC address and user authentication using a user ID and password. If both the MAC authentication and the user authentication are successful, the BMC 126 executes the IPMI command. If at least one of the MAC authentication and the user authentication fails, the BMC 126 returns an error message, without executing the IPMI command. For example, if the authentication process fails, the BMC 126 invalidates subsequent communication.

The BMC 126 holds authentication information to be used for authenticating connections to the management port 132 or NIC 133, 134 and authentication information to be used for authenticating connections to the service providing port 131, separately. In the case where authentication using the former authentication information is successful, the BMC 126 is able to execute specified types of IPMI commands including commands for behavioral change, as with the BMC 106 of the server device 100b. In the case where authentication using the latter authentication information is successful, the BMC 126 permits only execution of a read process but does not permit execution of a write process or a behavioral change process, other than the read process. That is, an authority to be given to an entity connecting to the service providing port 131 is limited to a read authority only.

The network controller 127 performs protocol processing in order to control packet communication. The network controller 127 is connected to the BMC 126 and service providing port 131. However, the network controller 127 is not connected to the network controller 128, 129, and in addition, is not accessed from the CPU 121 via the PCH 125 and BMC 126. That is to say, the network controller 127 is physically isolated from the OS-side hardware.

When a packet including an IPMI command arrives at the service providing port 131, the network controller 127 performs an authentication process, as with the BMC 126. The authentication process includes MAC authentication using a transmission-source MAC address and user authentication using a user ID and password. If both the MAC authentication and the user authentication are successful, the network controller 127 outputs the IPMI command to the BMC 126. If at least one of the MAC authentication and the user authentication fails, the network controller 127 returns an error message, without outputting the IPMI command to the BMC 126.

Authentication information is registered in advance by using a prescribed IPMI command in the BMC 126 and the network controller 127, for example. The prescribed IPMI command is input via the management port 132 (via the NIC 133, 134 in the case of the shared type). For example, the authentication information corresponding to the service providing port 131 is registered by a user company, which is an entity that gives an authority to connect to the service providing port 131, together with the authentication information corresponding to the management port 132.

The service providing port 131 is a communication port that is connected to the service providing LAN 33, and is physically separated from the management port 132. The service providing port 131 is able to perform communication based on Transmission Control Protocol (TCP)/IP. The service providing port 131 is connected to a communication device, such as a switch or a router, with a cable.

Figure 6:
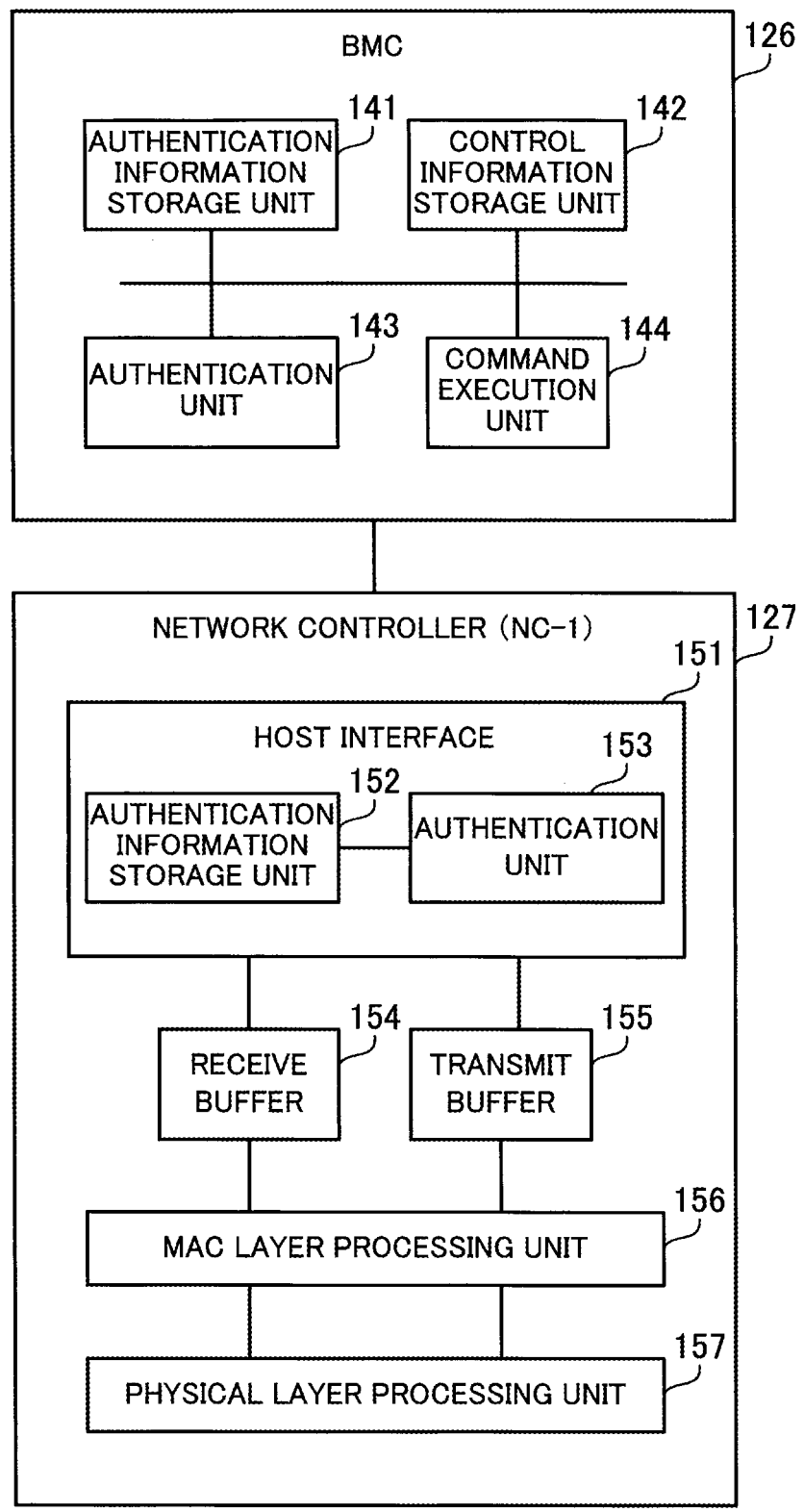
FIG. 6 is a block diagram illustrating an example of a Baseboard Management Controller (BMC) and a network controller.

FIG. 6 is a block diagram illustrating an example of a BMC and a network controller.

The BMC 126 includes an authentication information storage unit 141, a control information storage unit 142, an authentication unit 143, and a command execution unit 144. For example, the authentication information storage unit 141 and control information storage unit 142 are implemented by using a volatile semiconductor memory (e.g., RAM) or a non-volatile semiconductor memory (e.g., flash memory). The authentication information storage unit 141 and control information storage unit 142 may be different storage devices, or may be different storage areas on the same storage device. The authentication unit 143 and command execution unit 144 may be implemented by using Application Specific Integrated Circuits (ASICs), Field Programmable Gate Arrays (FPGAs), or other electronic circuits. In addition, the authentication unit 143 and command execution unit 144 may be implemented by using firmware and a processor that executes the firmware. In this case, the authentication unit 143 and command execution unit 144 may be implemented by using the same processor.

In this connection, the authentication information storage unit 141 corresponds to the authentication unique information storage unit 18 of the first embodiment. The control information storage unit 142 corresponds to the storage device 12 of the first embodiment. The command execution unit 144 corresponds to the processor 11 of the first embodiment.

The authentication information storage unit 141 stores therein authentication information to be used in an authentication process. The authentication information storage unit 141 stores therein authentication information corresponding to the service providing port 131 and authentication information corresponding to the management port 132 separately. These two kinds of authentication information may be stored in different storage devices. The authentication information includes a previously registered MAC address and previously registered user ID and password. The authentication information corresponding to the management port 132 additionally includes an access level in association with a user ID. The access level indicates a range of user authority and is associated with executable operations. A relation between access level and executable operations may be fixed or changeable. In the latter case, access level information associating an access level with executable operations may be stored in the authentication information storage unit 141.

The control information storage unit 142 stores therein internal control information of the server device 100, which the BMC 126 collects. The control information includes sensor information, such as power consumption, temperature, and fan rotation speed, and log information indicating the usage of computing resources.

When the BMC 126 receives an IPMI command, the authentication unit 143 performs an authentication process using the authentication information stored in the authentication information storage unit 141. The authentication unit 143 first performs MAC authentication using a transmission-source MAC address appended to a packet including the IPMI command and the previously registered MAC address. If these two MAC addresses match, it means that the MAC authentication is successful. If the MAC authentication is successful, the authentication unit 143 then performs user authentication using a user ID and password appended to the IPMI command and the previously registered user ID and password. If the user IDs match and the passwords also match, it means that the user authentication is successful. If the user authentication is successful, the authentication unit 143 determines executable operations.

In the case where the authentication process using the authentication information corresponding to the service providing port 131 is successful, the authentication unit 143 permits the command execution unit 144 to execute only a read operation. In the case where the authentication process using the authentication information corresponding to the management port 132 is successful, the authentication unit 143 permits the command execution unit 144 to execute operations according to the access level associated with the user ID. Note that the BMC 126 does not need to determine which of the network controllers 127, 128, and 129 the IPMI command has passed through, that is, which of the NCSI-1, NCSI-2, and NCSI-3 the IPMI command has passed through. In this connection, the BMC 126 may be configured to determine what entity has outputted the IPMI command. In this case, the authentication information corresponding to the service providing port 131 and the authentication information corresponding to the management port 132 do not need to be provided separately from each other.

In the case where the authentication unit 143 has succeeded the authentication process, the command execution unit 144 performs a process according to the received IPMI command. For example, the command execution unit 144 reads some or all of the control information from the control information storage unit 142 and outputs the read control information. In addition, for example, the command execution unit 144 rewrites the authentication information stored in the authentication information storage unit 141 or the control information stored in the control information storage unit 142. Moreover, for example, the command execution unit 144 changes the behavior of hardware components in the server device 100, for example, activates the CPUs 121 and 122 that are currently inactive or deactivates the CPUs 121 and 122 that are currently operating.

At this time, the command execution unit 144 performs only processes in the range of executable operations determined by the authentication unit 143, and rejects processes that are out of the range of executable operations. If a process according to a received IPMI command is rejected, an error message is output. If a process according to the received IPMI command is completed, the execution result is output.

The network controller 127 includes a host interface 151, a receive buffer 154, a transmit buffer 155, an MAC layer processing unit 156, and a physical layer processing unit 157. The host interface 151 includes an authentication information storage unit 152 and an authentication unit 153. The authentication information storage unit 152 is implemented by using a volatile semiconductor memory (e.g., RAM) or a non-volatile semiconductor memory (e.g., flash memory). The receive buffer 154 and the transmit buffer 155 are implemented by using a volatile semiconductor memory, for example. At least one of the authentication unit 153, MAC layer processing unit 156, and physical layer processing unit 157 is implemented by using an electronic circuit (e.g., ASIC and FPGA) or a processor. In this connection, the authentication information storage unit 152 corresponds to the authentication login information storage unit 16 of the first embodiment.

The authentication information storage unit 152 stores therein authentication information that is the same as that corresponding to the service providing port 131, among the authentication information stored in the authentication information storage unit 141. That is, this authentication information includes a MAC address registered in association with the service providing port 131, a user ID and password registered in association with the service providing port 131.

When an IPMI command arrives at the receive buffer 154, the authentication unit 153 performs an authentication process using the authentication information stored in the authentication information storage unit 152, as with the authentication unit 143. The authentication unit 153 first performs MAC authentication using a transmission-source MAC address appended to a packet including the IPMI command and the previously registered MAC address. If the MAC authentication is successful, the authentication unit 153 further performs user authentication using a user ID and password appended to the IPMI command and the previously registered user ID and password. If the user authentication is successful, the authentication unit 153 outputs the IPMI command to the BMC 126. If the MAC authentication or user authentication fails, the authentication unit 153 stores an error message in the transmit buffer 155, without outputting the IPMI command to the BMC 126.

The receive buffer 154 is a First-in First-out (FIFO) buffer memory. The receive buffer 154 is a buffer where received packets are written by the MAC layer processing unit 156 and the packets are read by the host interface 151 in the same order in which they were written. The host interface 151 refers to the transmission-source MAC address, and therefore this packet is stored in association with the MAC header. The transmit buffer 155 is a FIFO buffer memory. The transmit buffer 155 is a buffer where packets to be transmitted are written by the host interface 151 and the packets are read by the MAC layer processing unit 156 in the same order in which they were written.

The MAC layer processing unit 156 processes a MAC header in accordance with a MAC-layer communication protocol among the communication protocols that are used by the service providing LAN 33. The MAC layer processing unit 156 receives packets from the physical layer processing unit 157, and writes the packets in the receive buffer 154 after processing the packets such as deleting of a MAC header. In addition, the MAC layer processing unit 156 reads a packet from the transmit buffer 155, and outputs the packet to the physical layer processing unit 157 after processing the packet such as addition of a MAC header.

The physical layer processing unit 157 performs signal processing in accordance with a physical layer communication protocol among the communication protocols that are used by the service providing LAN 33. The physical layer processing unit 157 extracts packets from the received signal received at the service providing port 131, and outputs the packets to the MAC layer processing unit 156. In addition, the physical layer processing unit 157 converts the packets received from the MAC layer processing unit 156 to a transmit signal that is then transmitted from the service providing port 131.

Figure 7:
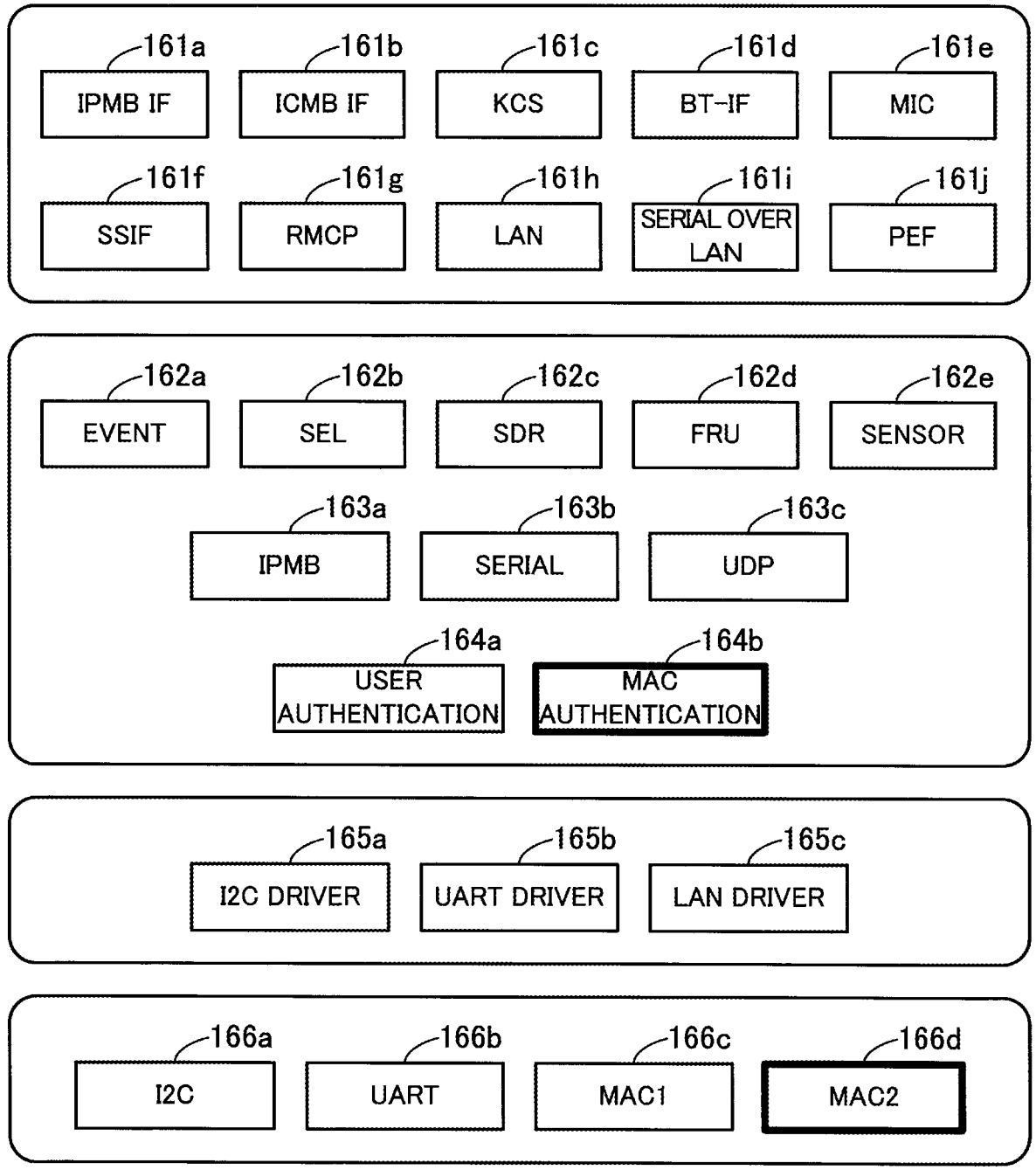
FIG. 7 illustrates an example of a software stack of the BMC.

FIG. 7 illustrates an example of a software stack of the BMC.

In the case where the above-described various functions are implemented by using a processor and firmware, the BMC 126 has a software stack as illustrated in FIG. 7, for example.

A block 161*a* indicates an Intelligent Platform Management Bus (IPMB) interface (IF), which is an internal bus interface for interconnection between internal devices of the server device 100. A block 161*b* indicates an Intelligent Chassis Management Bus (ICMB) interface, which is an external bus interface for connection with another server device. A block 161*c* indicates the above-described KCS. A block 161*d* indicates a Block Transfer (BT) interface, which is an interface for communicating data with the BMC 126 on a data block basis.

A block 161*e* indicates a Management Interface Chip (MIC), which is a chip on which a management interface is mounted. A block 161*f* indicates a SMBus System Interface (SSIF), which is a low pin count interface for connecting a low-bandwidth device to the BMC 126. A block 161*g* indicates a Remote Management Control Protocol (RMCP), which is a protocol based on User Data Protocol (UDP) for performing remote control. A block 161*h* indicates a LAN interface. A block 161*i* indicates a serial over LAN, which is an interface for accessing a serial console via LAN. A block 161*j* indicates a Platform Event Filtering (PEF), which is an interface for defining how the BMC 126 operates when the BMC 126 receives an event message.

A block 162*a* indicates event data. A block 162*b* indicates a System Event Log (SEL). A block 162*c* indicates a Sensor Data Record (SDR). A block 162*d* indicates Field Replacement Unit (FRU) data representing replaceable units. A block 162*e* indicates sensor data. The blocks 162*a*, 162*b*, 162*c*, 162*d*, and 162*e* belong to a data layer.

A block 163*a* indicates IPMB communication. A block 163*b* indicates serial communication. A block 163*c* indicates UDP communication. A block 164*a* indicates user authentication using a user ID and password. A block 164*b* indicates MAC authentication using a transmission-source MAC address (for example, a MAC address assigned to the terminal device 200). The blocks 164*a* and 164*b* belong to a security layer.

A block 165*a* indicates an Inter-Integrated Circuit (I2C) driver, which is a driver program that enables different electronic circuits to communicate with each other. A block 165*b* indicates a Universal Asynchronous Receiver Transmitter (UART) driver, which is a driver program for serial-parallel conversion. A block 165*c* indicates a LAN driver, which is a driver program for performing LAN communication. A block 166a indicates I2C. A block 166b indicates UART. A block 166c indicates the MAC (MAC1) of the management port 132. A block 166d indicates the MAC (MAC2) of the service providing port 131.

FIG. 8 illustrates an example of authentication tables.

The authentication information storage unit 141 of the BMC 126 stores therein a management port authentication table 171.

The management port authentication table 171 has the following columns: User ID, Password, MAC Address, and Access Level. The User ID column contains an identifier assigned to a user who uses the management port 132 (NIC 133, 134 in the case of the shared type). As this user ID, an identifier assigned to a staff member of the user company may be used. The Password column contains a password in association with the user ID. The registered password may be a hash value or ciphertext obtained by converting plain text, in order to reduce a risk of leakage of the password. In this case, whether a received password matches the registered password is determined by comparing their hash values or ciphertexts with each other.

The MAC Address column contains the MAC address of a terminal device that is expected to connect to the management port 132 (NIC 133, 134 in the case of the shared type). As this MAC address, the MAC address of the terminal device used by the user company (for example, the MAC address of the terminal device 200a) may be used. The Access Level column contains a user's access level in association with the user ID. An access level to be registered is "admin", "user", or "operator". The "admin" indicates an authority for administrator and is an access level that permits all operations executable by the BMC 126. The "user" is an access level that permits a read operation and some other operations. The "operator" is an access level that permits strictly limited operations only.

The management port authentication table 171 is able to contain one or more user IDs and one or more MAC addresses. A user ID and a MAC address may or may not be linked to each other. In the former case, if user authentication using any registered user ID and registered password is successful, the MAC authentication is performed using the registered MAC address linked to the registered user ID. In the latter case, if a received user ID and password match any registered user ID and password, the user authentication is successful, and if a transmission-source MAC address matches any registered MAC address, irrespective of this success of the user authentication, the MAC authentication is successful.

In addition, the authentication information storage unit 141 of the BMC 126 also stores therein a service providing port authentication table 172. The authentication information storage unit 152 of the network controller 127 stores therein a service providing port authentication table like the service providing port authentication table 172.

The service providing port authentication table 172 has the following columns: User ID, Password, and MAC Address. The service providing port authentication table 172 does not need an Access Level column. The user ID column contains an identifier assigned to a user who uses the service providing port 131. As this user ID, an identifier assigned to a staff member of the data center provider may be used. The Password column contains a password in association with the user ID. The MAC Address column contains the MAC address of a terminal device that is expected to connect to the service providing port 131. As this MAC address, the MAC address of a terminal device used by the data center provider (for example, the MAC address of the terminal device 200) may be used. The service providing port authentication table 172 is able to store therein one or more user IDs and one or more MAC addresses.

FIG. 9 illustrates an example of an access level table.

The authentication information storage unit 141 of the BMC 126 may store therein an access level table 173. This access level table 173 may be edited by using IPMI commands that pass through the management port 132 (NIC 133, 134 in the case of the shared type).

The access level table 173 has the following columns: Operation Type, Admin, User, and Operator. The Operation Type column contains the name of an operation that is executed by the BMC 126. The Admin column contains a flag indicating whether to permit a user who has an access level of "admin" to perform a corresponding operation, in association with the operation type. The User column contains a flag indicating whether to permit a user with an access level of "user" to perform a corresponding operation in association with the operation type. The Operator column contains a flag indicating whether to permit a user with an access level of "operator" to perform a corresponding operation, in association with the operation type. The flag is represented by "1" indicating permission or "0" indicating rejection.

The following describes how the BMC 126 and network controller 127 operate.

Figure 10:
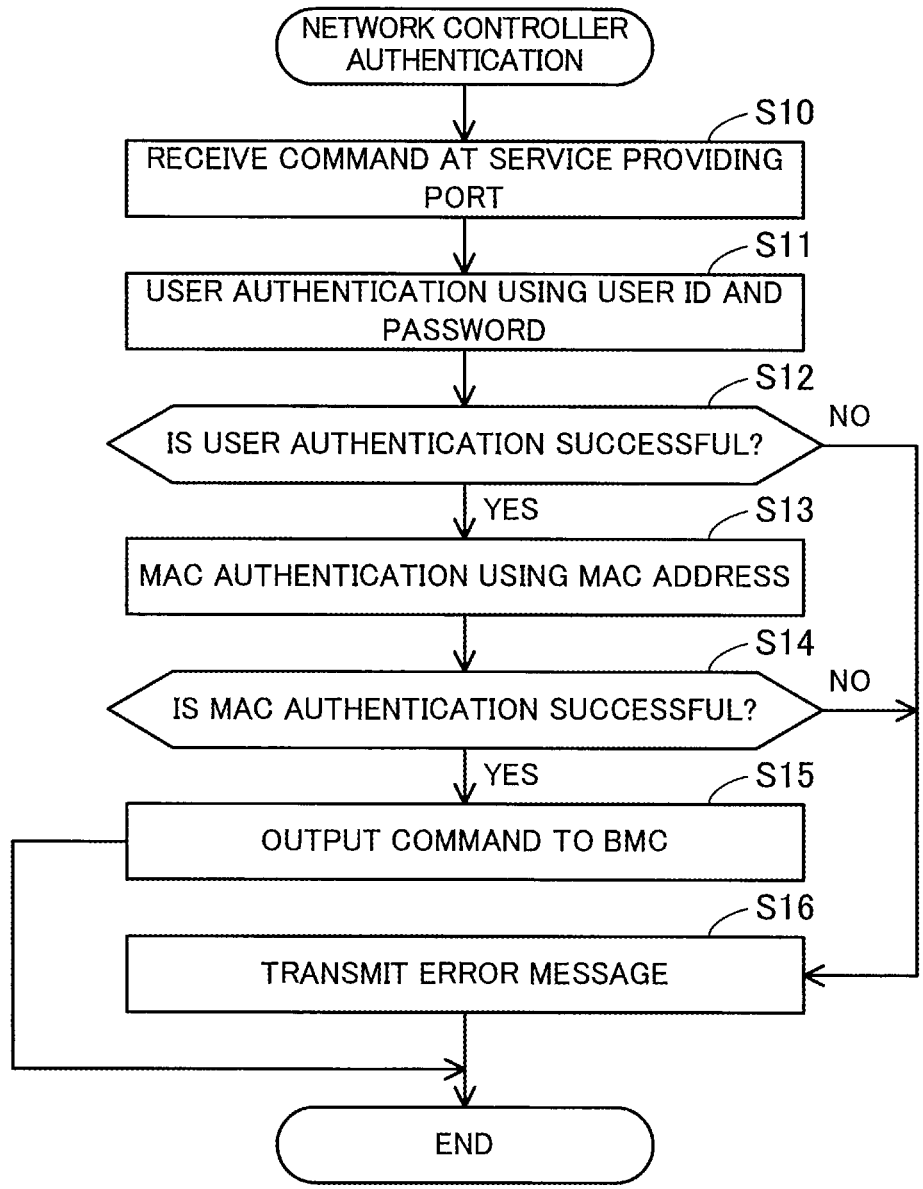
FIG. 10 is a flowchart illustrating an example of network controller authentication.

FIG. 10 is a flowchart illustrating an example of network controller authentication.

(S10) A packet including an IPMI command is received at the service providing port 131. The authentication unit 153 obtains the IPMI command having a user ID and password appended thereto. In addition, the authentication unit 153 obtains a transmission-source MAC address included in the packet.

(S11) The authentication unit 153 performs user authentication using the user ID and password received from the terminal device 200. More specifically, the authentication unit 153 determines whether a combination of the received user ID and password matches any combination of a user ID and password registered in the service providing port authentication table stored in the authentication information storage unit 152. If a match is found, the user authentication is successful. If no match is found, the user authentication fails.

(S12) The authentication unit 153 determines whether the user authentication at step S11 is successful. If it is successful, the process proceeds to step S13. If it is unsuccessful, the process proceeds to step S16.

(S13) The authentication unit 153 performs MAC authentication using the transmission-source MAC address of the terminal device 200. More specifically, the authentication unit 153 determines whether the transmission-source MAC address matches any of the MAC addresses registered in the service providing port authentication table stored in the authentication information storage unit 152. In this connection, the authentication unit 153 may determine whether the transmission-source MAC address matches the MAC address linked to the user ID of step S11 among the MAC addresses registered in the service providing port authentication table. If a match is found, the MAC authentication is successful. If no match is found, the MAC authentication fails.

(S14) The authentication unit 153 determines whether the MAC authentication at step S13 is successful. If it is successful, the process proceeds to step S15. If it is unsuccessful, the process proceeds to step S16.

(S15) The authentication unit 153 outputs the IPMI command to the BMC 126.

(S16) The authentication unit 153 writes a packet including an error message in the transmit buffer 155, without outputting the IPMI command to the BMC 126. The packet including the error message is transmitted to the terminal device 200 via the service providing port 131.

In this connection, in the above example, the MAC authentication is performed after the user authentication. Alternatively, the MAC authentication may be performed before the user authentication.

Figure 11:
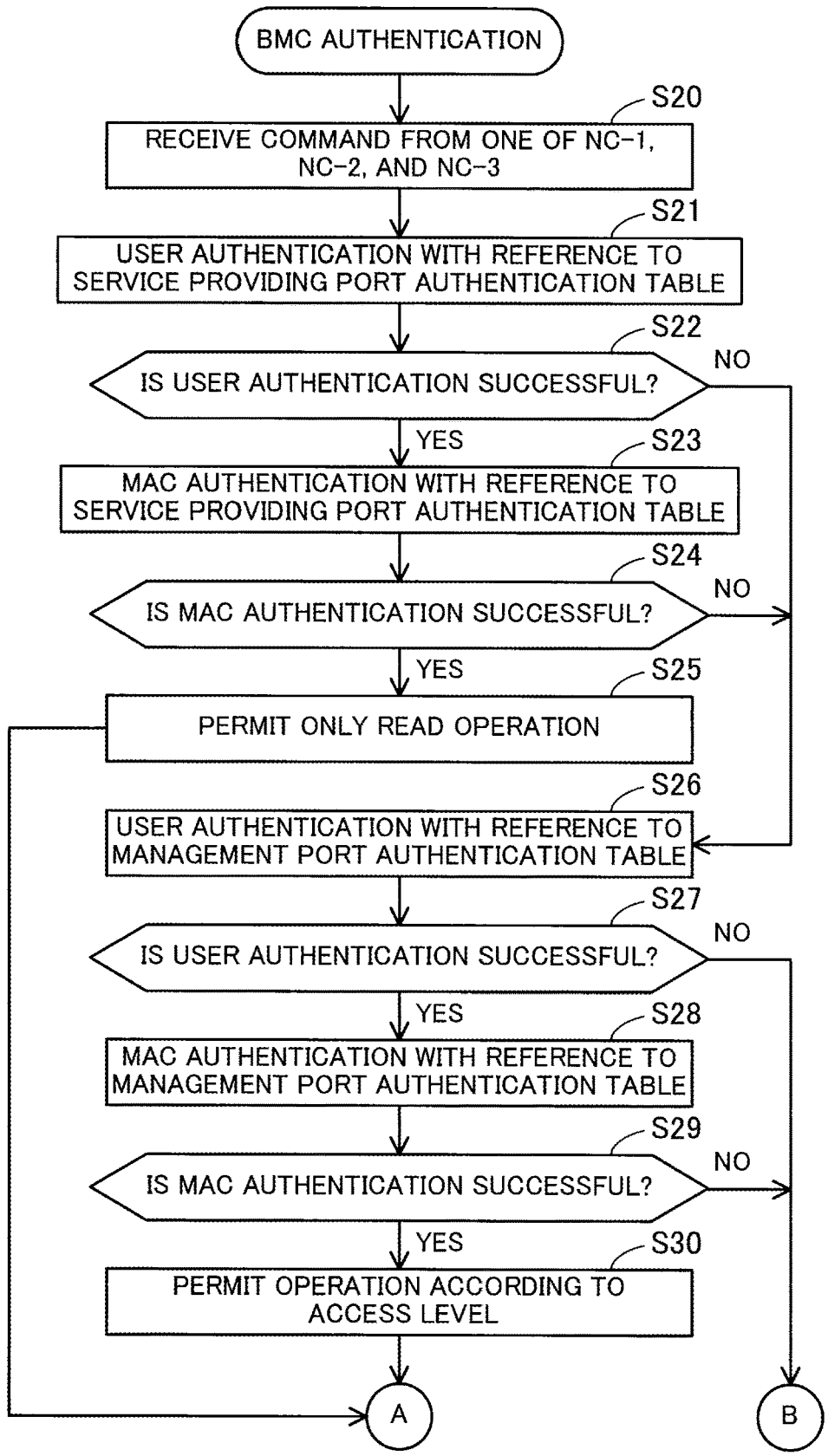
FIGS. 11 and 12 are a flowchart illustrating an example of BMC authentication.
Figure 12:
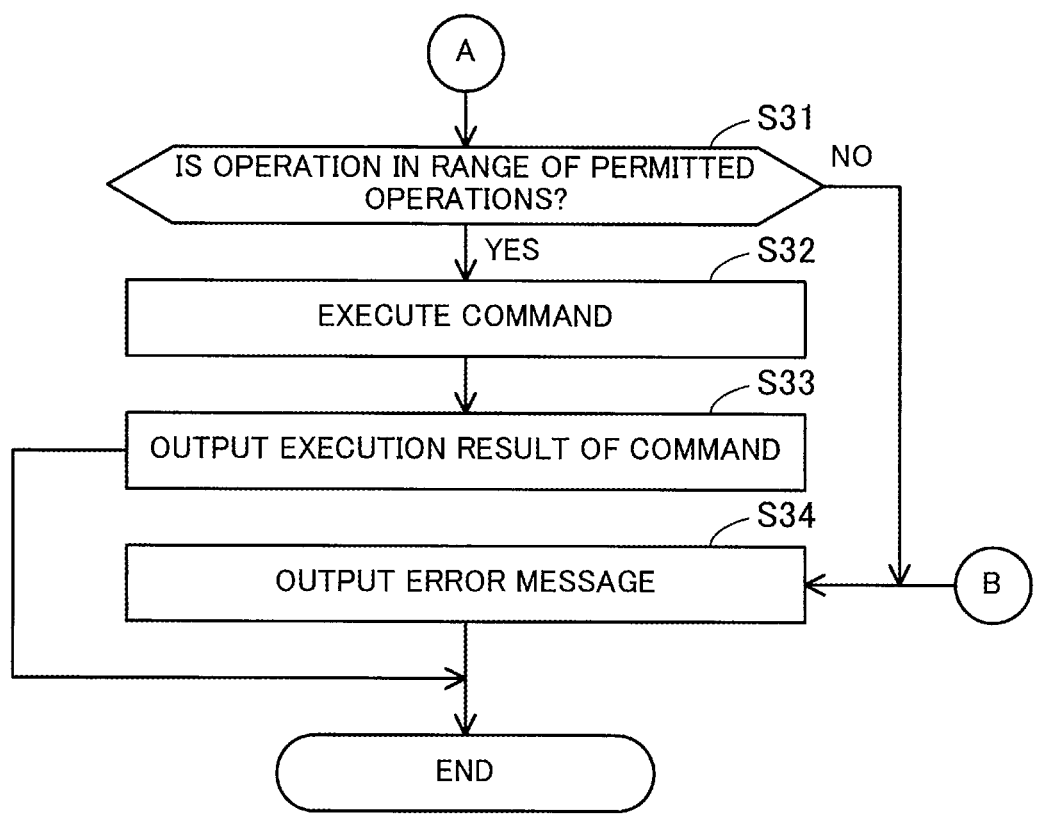

FIGS. 11 and 12 are a flowchart illustrating an example of BMC authentication.

(S20) The authentication unit 143 receives an IPMI command having a user ID and password appended thereto, from one of the network controllers 127, 128, and 129. In addition, the authentication unit 143 obtains a transmission-source MAC address included in the packet.

(S21) The authentication unit 143 performs user authentication with reference to the service providing port authentication table 172 stored in the authentication information storage unit 141. More specifically, the authentication unit 143 determines whether the combination of the received user ID and password matches any combination of a user ID and password registered in the service providing port authentication table 172. If a match is found, the user authentication is successful. If no match is found, the user authentication fails.

(S22) The authentication unit 143 determines whether the user authentication at step S21 is successful. If it is successful, the process proceeds to step S23. If it is unsuccessful, the process proceeds to step S26.

(S23) The authentication unit 143 performs MAC authentication with reference to the service providing port authentication table 172 stored in the authentication information storage unit 141. More specifically, the authentication unit 143 determines whether the transmission-source MAC address matches any one of the MAC addresses registered in the service providing port authentication table 172. In this connection, the authentication unit 143 may determine whether the transmission-source MAC address matches the MAC address linked to the user ID of step S21 among the MAC addresses registered in the service providing port authentication table 172. If a match is found, the MAC authentication is successful. If no match is found, the MAC authentication fails.

(S24) The authentication unit 143 determines whether the MAC authentication at step S23 is successful. If it is successful, the process proceeds to step S25. If it is unsuccessful, the process proceeds to step S26.

(S25) The authentication unit 143 permits the command execution unit 144 to execute only a read operation. Then, the process proceeds to step S31.

(S26) The authentication unit 143 performs user authentication with reference to the management port authentication table 171 stored in the authentication information storage unit 141. More specifically, the authentication unit 143 determines whether the combination of the received user ID and password matches any combination of a user ID and password registered in the management port authentication table 171. If a match is found, the user authentication is successful. If no match is found, the user authentication fails.

(S27) The authentication unit 143 determines whether the user authentication at step S26 is successful. If it is successful, the process proceeds to step S28. If it is unsuccessful, the process proceeds to step S34.

(S28) The authentication unit 143 performs MAC authentication with reference to the management port authentication table 171 stored in the authentication information storage unit 141. More specifically, the authentication unit 143 determines whether the transmission-source MAC address matches any one of the MAC addresses registered in the management port authentication table 171. In this connection, the authentication unit 143 may determine whether the transmission-source MAC address matches the MAC address linked to the user ID of step S26 among the MAC addresses registered in the management port authentication table 171. If a match is found, the MAC authentication is successful. If no match is found, the MAC authentication fails.

(S29) The authentication unit 143 determines whether the MAC authentication at step S28 is successful. If it is successful, the process proceeds to step S30. If it is unsuccessful, the process proceeds to step S34.

(S30) The authentication unit 143 determines an access level associated with the received user ID with reference to the management port authentication table 171. The authentication unit 143 searches the access level table 173 stored in the authentication information storage unit 141 to find operations permitted under the determined access level, and permits the command execution unit 144 to execute the found operations only. Then, the process proceeds to step S31.

Refer now to FIG. 12.

(S31) The command execution unit 144 determines whether the operation according to the IPMI command to be executed is in the range of operations permitted at step S25 or S30. If the operation is in the range of permitted operations, the process proceeds to step S32. If the operation is out of the range of permitted operations, the process proceeds to step S34.

(S32) The command execution unit 144 executes the IPMI command.

(S33) The command execution unit 144 outputs the result of executing the IPMI command. The execution result may include the control information read from the control information storage unit 142. The execution result may indicate whether the write of authentication information in the authentication information storage unit 141 or authentication information storage unit 152 is successful or not. The execution result may indicate whether the write of control information in the control information storage unit 142 is successful or not. Furthermore, the execution result may indicate whether the behavioral change of hardware components, such as the CPUs 121 and 122, is successful or not. A packet including the execution result may be transmitted to the terminal device 200 via the network controller 127 and service providing port 131. The packet including the execution result may be transmitted to the terminal device 200a via the network controller 128 and management port 132.

(S34) The command execution unit 144 generates and outputs an error message, without executing the IPMI command. A packet including the error message may be transmitted to the terminal device 200 via the network controller 127 and service providing port 131. The packet including the error message may be transmitted to the terminal device 200a via the network controller 128 and management port 132.

In the above example, the MAC authentication is performed after the user authentication. Alternatively, the MAC authentication may be performed before the user authentication.

Figure 13:
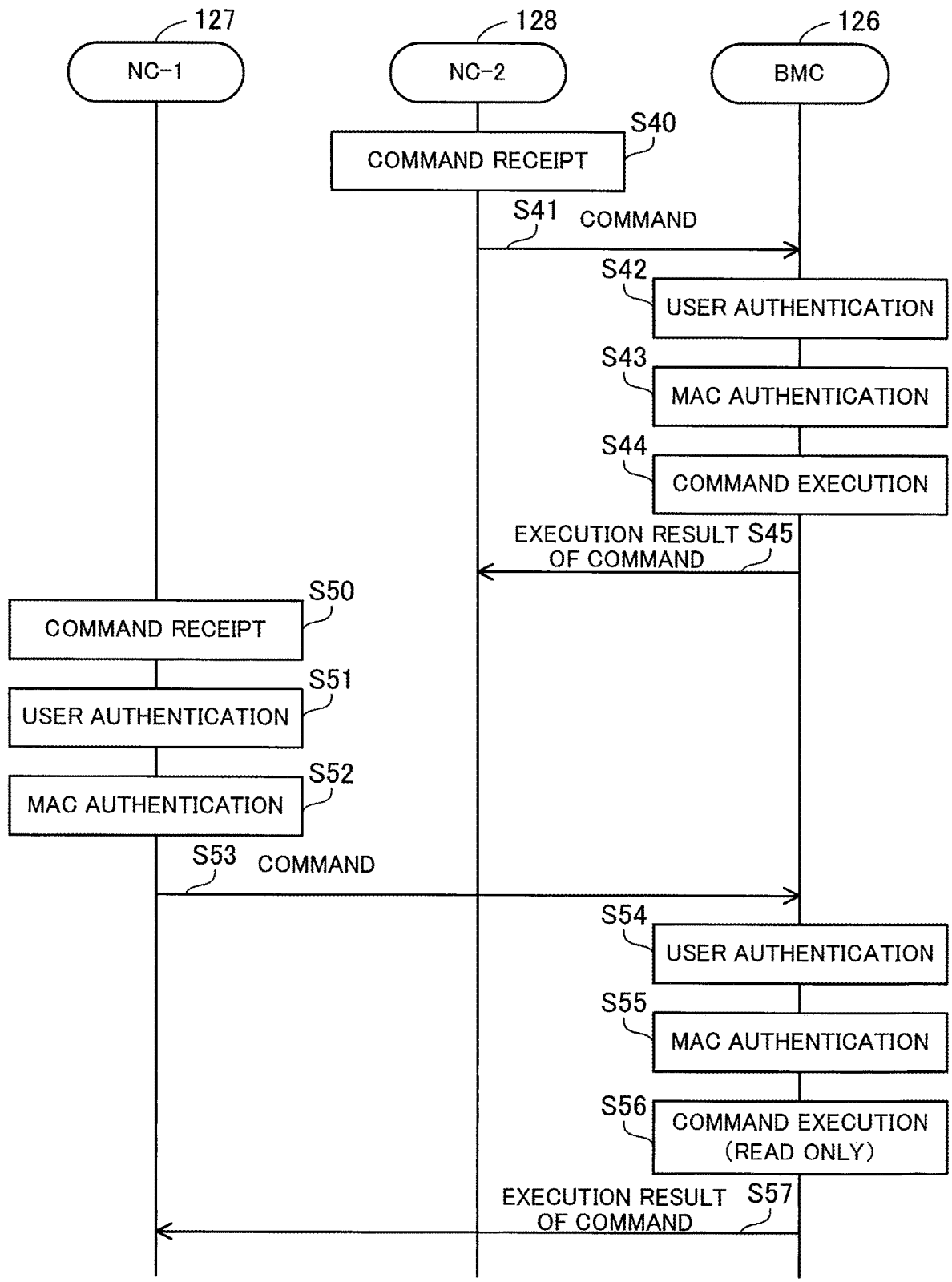
FIG. 13 is a sequence diagram illustrating an example of command execution.

FIG. 13 is a sequence diagram illustrating an example of command execution.

When an IPMI command arrives at the management port 132, the network controller 128 obtains the IPMI command (S40). The network controller 128 outputs the IPMI command to the BMC 126 (S41). The BMC 126 performs user authentication using a user ID and password appended to the IPMI command (S42), and if the user authentication is successful, performs MAC authentication using a transmission-source MAC address (S43). If the MAC authentication is successful, the BMC 126 executes the IPMI command (S44), and outputs the result of executing the IPMI command to the network controller 128 (S45). The network controller 128 transmits the execution result from the management port 132.

When an IPMI command arrives at the service providing port 131, on the other hand, the network controller 127 obtains the IPMI command (S50). The network controller 127 performs user authentication using a user ID and password appended to the IPMI command (S51), and if the user authentication is successful, performs MAC authentication using a transmission-source MAC address (S52). If the MAC authentication is successful, the network controller 127 outputs the IPMI command to the BMC 126 (S53).

When receiving the IPMI command, the BMC 126 performs user authentication using the user ID and password appended to the IPMI command (S54), and if the user authentication is successful, performs MAC authentication using the transmission-source MAC address (S55). If the MAC authentication is successful, the BMC 126 executes the IPMI command (S56), and outputs the result of executing the IPMI command to the network controller 127 (S57). In this connection, the BMC 126 limits the operation according to the IPMI command to a read operation for control information only. The network controller 127 transmits the execution result from the service providing port 131.

FIG. 14 illustrates an example of a command execution screen.

The command execution screen 221 is an example of a screen to be displayed on the display 211 of the terminal device 200, and includes IPMI commands transmitted and corresponding execution results received.

For example, an IPMI command, "sdr|grep "Ambient"," is transmitted from the terminal device 200 to the server device 100. This IPMI command is to obtain control information indicating the intake air temperature of the server device 100. In response to this IPMI command, an execution result, "19 degrees C.," is returned from the server device 100 to the terminal device 200. This execution result indicates that the intake air is 19 degrees Celsius.

Further, for example, an IPMI command, "sdr|grep "FAN"," is transmitted from the terminal device 200 to the server device 100. This IPMI command is to obtain control information indicating the fan rotation speed of the server device 100. In response to this IPMI command, an execution result, "5520 RPM," is returned from the server device 100 to the terminal device 200. This execution result indicates that the fan rotation speed is 5520 rotations per minute.

Still further, for example, an IPMI command, "raw 0x3 0x1 0x12c," is transmitted from the terminal device 200 to the server device 100. This IPMI command is to limit the power consumption of the server device 100 to 300 W. In response to this IPMI command, an error message, "General error: readonly," is returned from the server device 100 to the terminal device 200. This error message indicates that the limiting of power consumption is rejected. Since the service providing port 131 is a communication port for read only, execution of an IPMI command may be rejected depending on the contents of the IPMI command.

The following describes examples of an operations management service that the data center provider is able to provide for the user company by using the service providing LAN 33.

(1) The terminal device 200 collects, from each server device via the service providing LAN 33, server's internal temperature information including intake air temperature, exhaust air temperature, CPU temperature, and memory temperature. The terminal device 200 predicts the temperature of each server device after one hour on the basis of the collected server's internal temperature information, and determines an appropriate outlet air temperature and air volume for an air conditioning system provided in the data center, on the basis of the prediction result. The terminal device 200 transmits a Simple Network Management Protocol (SNMP) packet to the air conditioning system to change its outlet air temperature and air volume. This makes it possible to eliminate the need of operating the air conditioning system excessively and thus reduce the operating cost of the data center. Such an energy-saving operations service reduces the cost the user company needs to incur.

(2) The terminal device 200 collects, from each server device over the service providing LAN 33, resource information including CPU usage and RAM usage. The terminal device 200 analyzes chronological changes in the resource information for each user company, and predicts future resource usage. The data center provider is able to provide an operations improvement service that involves making an improvement plan, like a change in load balance among the server devices, on the basis of the prediction result and providing the user company with the improvement plan.

(3) The terminal device 200 collects electricity information including power consumption and component voltage from each server device over the service providing LAN 33. The terminal device 200 then analyzes chronological changes in the collected electricity information to predict a failure in each server device. The data center provider is able to provide a failure prediction service that involves notifying the user company of a future possible failure of their server device if the server device is predicted to have high possibility of failure within a prescribed period.

(4) The terminal device 200 collects resource information including CPU usage and RAM usage from each server device over the service providing LAN 33. The terminal device 200 determines whether there is a lack of resources, on the basis of the collected resource information. The data center provider is able to provide a capacity planning service that involves suggesting an addition of a server device or an enhancement of computing resources to the user company if there is a lack of resources.

In the information processing system of the second embodiment, the service providing port 131 for read only is provided, which permits only a read operation for control information stored in the BMC 126 but rejects any other operations. For connection to the service providing port 131, the network controller 127 performs user authentication and MAC authentication, and in addition, the BMC 126 performs user authentication and MAC authentication. Moreover, separately from the service providing port 131, the management port 132 is provided which permits not only the read operation for the control information but also other operations.

As a result, the service providing port 131 has a higher level of security than the management port 132, so that the service providing port 131 is used as a highly safety IPMI communication port. Therefore, even if the user company that owns the server device 100 permits the data center provider to connect to the service providing port 131, this has a low security risk. In addition, the data center provider does not need to use the management port 132 and therefore the user company is able to use the management port 132 exclusively, without sharing it with the data center provider. This motivates the user company to permit the data center provider to connect to the service providing port 131. As a result, the data center provider is able to perform efficient operations management of the server device 100 using the control information held by the BMC 126. In addition, the data center provider is able to provide advanced operations management services for the user company.

According to one aspect, it is possible to provide a communication port having an improved level of security.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus that is accessed from a terminal device via a communication link, the terminal device being assigned unique information, the information processing apparatus comprising:
    a processor that executes a command received from the terminal device;
    a storage device that stores therein control information to be accessed from the terminal device;
    a plurality of communication ports including a communication port to which the terminal device is connectable;
    a first communication control device that includes an authentication login information storage unit that stores therein authentication login information to be used for authenticating access from the terminal device, and that compares, when the terminal device connects to a first communication port among the plurality of communication ports, login information received from the terminal device with the authentication login information, and outputs the command received from the terminal device when the login information matches the authentication login information; and
    a control device that includes a first authentication unique information storage unit that stores therein first authentication unique information to be used for authenticating connection of the terminal device to the first communication port, and that compares, when the first communication control device outputs the command received from the terminal device, the unique information of the terminal device with the first authentication unique information, and when the unique information matches the first authentication unique information, causes the processor to perform only a process of reading the control information according to the command received from the terminal device.

2. The information processing apparatus according to claim 1, further comprising
    a second communication control device that outputs the command received from the terminal device when the terminal device connects to a second communication port among the plurality of communication ports,
    wherein the control device includes a second authentication unique information storage unit that stores therein second authentication unique information to be used for authenticating connection of the terminal device to the second communication port, and compares, when the second communication control device outputs the command received from the terminal device, the unique information of the terminal device with the second authentication unique information, and when the unique information matches the second authentication unique information, causes the processor to perform a process according to the command received from the terminal device.

3. The information processing apparatus according to claim 1, further comprising a third communication control device that outputs the command received from the terminal device to the processor when the terminal device connects to a third communication port among the plurality of communication ports.

4. The information processing apparatus according to claim 1, wherein, when the login information does not match the authentication login information, the first communication control device outputs an error, without outputting the command received from the terminal device.

5. The information processing apparatus according to claim 1, wherein the control device outputs an error when the unique information of the terminal device does not match the first authentication unique information.

6. The information processing apparatus according to claim 2, wherein the control device outputs an error when the unique information of the terminal device does not match the second authentication unique information.

7. The information processing apparatus according to claim 1, wherein the control device outputs an error when the unique information of the terminal device matches the first authentication unique information and the command received from the terminal device is to request a process other than the process of reading the control information.

8. The information processing apparatus according to claim 1, wherein:
    the authentication login information storage unit further stores therein third authentication unique information corresponding to the first authentication unique information stored in the first authentication unique information storage unit; and
    the first communication control device outputs the command received from the terminal device when the login information matches the authentication login information and the unique information of the terminal device matches the third authentication unique information.

9. The information processing apparatus according to claim 1, wherein:
    the first authentication unique information storage unit further stores therein other authentication login information corresponding to the authentication login information stored in the authentication login information storage unit; and
    the control device causes the processor to perform only the process of reading the control information when the unique information of the terminal device matches the first authentication unique information and the login information matches the other authentication login information.

10. A method of controlling an information processing apparatus, the method comprising:
- comparing, by a first communication control device provided in the information processing apparatus including a plurality of communication ports, login information received from a terminal device with authentication login information stored in an authentication login information storage unit, when the terminal device connects to a first communication port among the plurality of communication ports via a communication link, the authentication login information being used for authenticating access from the terminal device;
- outputting, by the first communication control device, a command received from the terminal device to a control device when the login information matches the authentication login information, the control device being provided in the information processing apparatus;
- comparing, by the control device, unique information assigned to the terminal device with first authentication unique information stored in a first authentication unique information storage unit when the first communication control device outputs the command received from the terminal device, the first authentication unique information being used for authenticating connection of the terminal device; and
- causing, by the control device, a processor to perform only a process of reading control information stored in a storage device according to the command received from the terminal device when the unique information of the terminal device matches the first authentication unique information, the processor being provided in the information processing apparatus, the storage device being provided in the information processing apparatus.

* * * * *